United States Patent [19]
Garber, Jr.

[11] 3,848,567
[45] Nov. 19, 1974

[54] AQUARIUM
[76] Inventor: John W. Garber, Jr., 1815 Regents Park Rd., Crofton, Md. 21113
[22] Filed: Apr. 26, 1974
[21] Appl. No.: 464,681

[52] U.S. Cl.................................. 119/5, 210/169
[51] Int. Cl............................................ A01k 63/00
[58] Field of Search................ 119/3, 5, 2; 210/169

[56] References Cited
UNITED STATES PATENTS
3,232,271    2/1966    Dosamantes De Jose............. 119/5
3,418,973   12/1968    Saito.................................. 119/5 X Primary Examiner—Robert Peshock
Assistant Examiner—J. N. Eskovitz
Attorney, Agent, or Firm—Wenderoth, Lind & Ponack

[57] ABSTRACT

An improved salt water aquarium is disclosed. The aquarium includes a transparent tank member. A base member is positioned below and supports the transparent tank member. A combination air-water filter head is disposed in the base of the transparent tank member and communicates with the base member. An isolation valve is connected to the combination air-water filter head and to a filter unit positioned within the base member. The filter unit is substantially as large as the base, thus having a relatively large surface area. A valve, responsive to the liquid level of the filter unit, is positioned between the isolation valve and the filter unit for maintaining the water level within the filter unit at a predetermined desired level. A pump member and an associated check valve are coupled between the filter unit and the combination air-water filter head for returning purified water to the tank.

7 Claims, 4 Drawing Figures 3,848,567

AQUARIUM

BACKGROUND OF THE INVENTION

1. Field of the Invention

The invention relates to aquariums, and more particularly relates to aquariums wherein the hardware normally associated therewith is located beneath the aquarium and is hidden from view.

2. Description of the Prior Art

Salt water aquariums present unique problems to the enthusiast in that they require a high degree of mechanical, chemical and biological filtration. The most significant, and difficult to maintain, of the various methods of filtration, is biological filtration. Specifically, the salt water aquarium requires the use of various aerobic bacteria to mineralize (reduce to non-toxic nitrates) various toxic compounds produced by the reaction of the salt water with the bodily wastes of the aquatic specimens and excess food matter. These essential bacteria lodge and multiply primarily in the fine structure of the mechanical filtration medium and the essentiality of their preservation necessarily makes the cleaning of the filter an infrequent and dangerous process. The filter, over a period, becomes slimy and unpleasant to view and it is most desirable that it be hidden from sight.

Various prior references have positioned pumps, filters and the like beneath an artificial aquarium bottom or embedded them in the gravel bottom, in attempts to enhance the aesthetic qualities of the aquarium. Examples of such references include U.S. Pat. Nos. 3,232,271 and 3,292,579. A serious shortcoming with prior art devices is, however, apparent. Aerobic bacteria require a constant supply of oxygen. When a standard, tankside filter is used, the bacteria are always exposed to oxygenated water. If, however, an undergravel filter is used, the aerobic bacteria, in the event of a power failure, may well perish from a lack of oxygen.

SUMMARY OF THE INVENTION

It is therefore an object of the subject invention to provide a display tank which provides an uninhibited view of the aquatic specimens.

It is another object of the invention to provide a salt water aquarium which is not adversely affected by a power failure, and which operates at high efficiency.

DETAILED DESCRIPTION OF THE PREFERRED EMBODIMENT

Figure 1:
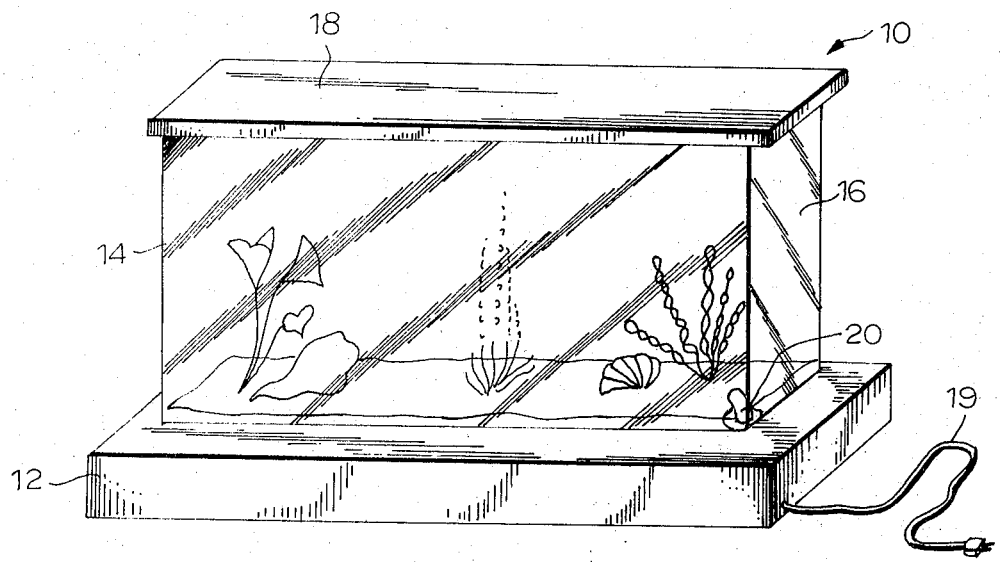
FIG. 1 is a perspective view of an aquarium embodying the subject invention.

Referring first to FIG. 1, the aquarium, generally indicated by reference numeral 10, includes a base 12 and a tank 14. The tank 14 is entirely transparent and the four wall members 16 are constructed of a transparent material such as, for example, glass or an acrylic resin product. The wall members are cemented to one another and form a watertight seal. The cement or sealant used must, of course, be inert in salt water. A transparent top member 18 rests atop the tank and, among other things, ensures that fish will not inadvertently leap out of the tank and that evaporation is minimized.

The base 12 encloses hardware of a nature normally associated with aquariums. This may include, for example, a thermostat-heating unit, a filter unit and a water circulating pump. The undertank location of these units, however, additionally requires the provision of several valves to control the flow direction. An electric power cord is shown by reference numeral 19 and provides power for all electrical appliances. A combination filter head, which may also be constructed from transparent material, is indicated by reference numeral 20. An access door (now shown) may be provided in the base 12.

Figure 2:
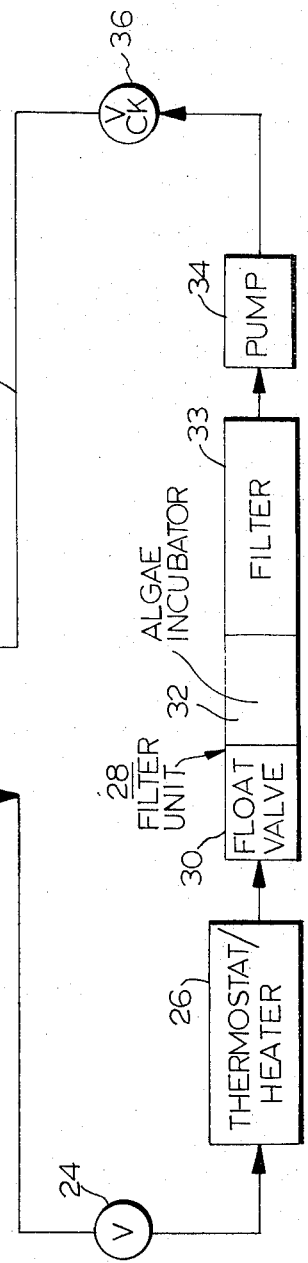
FIG. 2 schematically illustrates the apparatus used in the device of FIG. 1.

Now referring to FIG. 2, the arrangement of the equipment within the base may be appreciated. The combination filter head 20 is operatively connected to an air pump 22 of appropriate size for the volume of the aquarium and is also connected to the input 74 and output 76 of a filter system. A manually operated flow valve 24, normally open, is provided to halt the flow of water to the filter system when desired, such as during periodic cleaning of filter media. The heater-thermostat unit 26 may use a conventional resistive wire heater on a ceramic form. The heater is, however, appropriately repackaged as is well understood by those skilled in the art. The filter unit 28 (not shown to scale) includes a float valve 30, an algae incubator 32, and a filter region 33, seriatim. Pump 34 may be of conventional design. A check valve 36 is provided to prevent backflow when the pump is turned off or otherwise rendered inoperative due to, for instance, a power failure. The filter system is of sufficient capacity to process a volume of water every hour which is at least equal to the tank's capacity. The above-mentioned elements are serially connected in the described order by means of tubing 38 which may be of any salt-water-inert material, preferably flexible or semi-rigid, such as acrylic.

Figure 3:
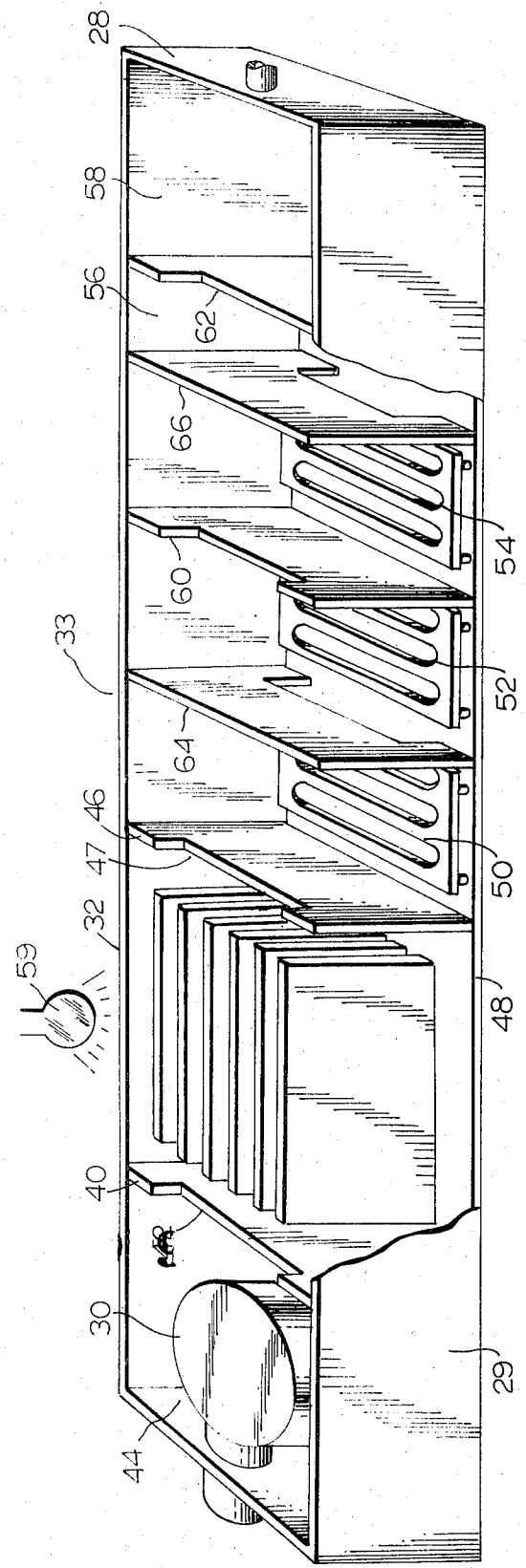
FIG. 3 discloses a preferred embodiment of the filter unit of FIG. 2.

FIG. 3 depicts the filter unit 28 of FIG. 2. The unit preferably has an integral housing 29. A valve responsive to the level of liquid in the filter, such as float valve 30, limits the ingress of water to the filter unit to control the water level within the filter unit and to maintain the water within the filter at any desired predetermined depth. The float valve is separated from the algae incubator 32 by a partition 40 having a downwardly stepped section 42. A float valve compartment 44 is defined by the partition 40 and the filter unit housing 29. The float valve is designed to limit the water level to slightly above the height of the stepped section 42 of the partition 40. The water passes from the float valve compartment 44 into the algae incubator 32 which is, in turn, separated from the filter region 33 by a stepped partition 46. The downwardly stepped region 47 of the partition 46 extends to a greater depth than corresponding region 42 of the partition 40 and consequently the height of the partition 46 in the stepped region is less than the height of the partition 40.

The filter region 33 includes a coarse filter region 50, a medium filter region 42, a fine filter region 54, a region 56 having an activated carbon filter and a discharge surge tank 58, the latter being connected to the pump 34. Regions 50, 52 and 54 are each substantially larger than region 56. Stepped partitions 60 and 62 are interposed with partitions 64 and 66 which have apertures in the bottoms thereof and form channels in combination with base 48 of the housing. The partitions 46, 64, 60, 66 and 62, respectively, define therebetween the above-mentioned filter regions. A coarse filter medium, such as polyurethane foam which can be frequently removed and washed, is provided in the coarse filter region 50. The medium filter region 52 may contain one of various synthetic wools and the fine filter material may be, for example, a compacted synthetic wool or any similar material having fine apertures therethrough. A light source 59 is provided as shown in FIG. 3 to promote the growth of algae.

The filter unit 28 is designed to be as large as possible to maximize efficiency, and, with the exception of the other required items, may occupy substantially the entire base 12. The filter unit is preferably uncovered or otherwise in communication with the atmosphere, thus providing the oxygen absorption of a side mounted power filter. In this manner, the aerobic bacteria colony will not be destroyed in the event of a power failure, contrary to the result obtained with undergravel and cannister filters of the prior art.

Figure 4:
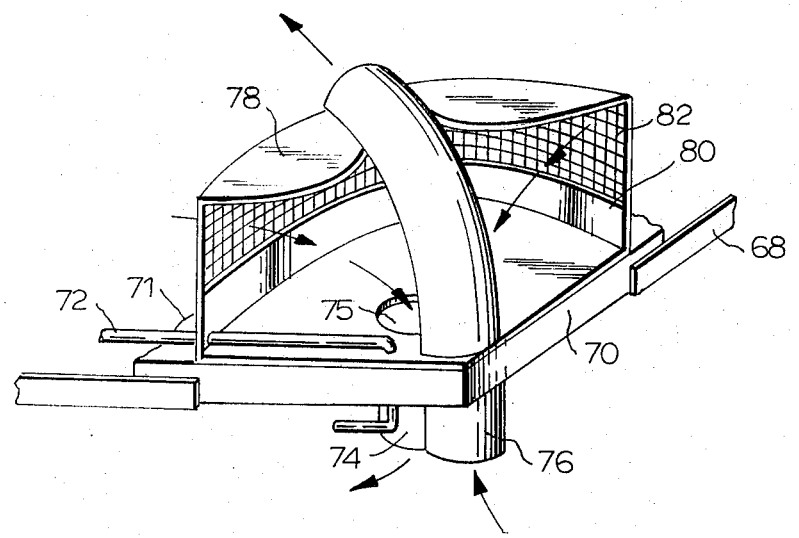
FIG. 4 discloses a preferred embodiment of the combination filter head of FIG. 2.

The combination filter head 20 may be better appreciated by referring to FIG. 4. Base 68 of the tank 14 has an aperture located in the corner in which the filter head 20 is positioned. The filter head, which is shaped to tightly fit against two adjacent wall sections and the base 68, includes a mounting plate 70 which conforms to the aperture and is water tightly sealed thereto. The mounting plate 70 has a flange 71 extending therefrom and forming a water-tight seal with the tank bottom 68. An air inlet conduit 72 extends through the mounting plate 70 and is connected to the air pump 22 for supplying fresh air to the aquarium. The conduit 72 is positioned parallel to and adjacent the base of the tank to be below the gravel level in the decorated aquarium. The water intake and discharge conduits 74 and 76, respectively, are provided for supplying water to and returning water from the filter system. The water intake conduit 74 communicates with the tank through aperture 75 in the mounting plate 70, while the water outlet conduit 76 extends into the tank. The inlet and outlet conduits are arranged to achieve a vigorous circular flow throughout the tank. A partition 78 is provided between the water inlet 74 and the water outlet 76 to ensure that cleaned water is recirculated into the tank and is not drawn directly back into the filter system. The partition member 78 is supported by a vertical section 80 which has a screened portion 82 through which water passes from the tank to the water intake conduit through the aperture 75 to the filter system. The screened portion 82 ensures that no large object, such as a fish, will be sucked into the filter system. The combination filter head may also be constructed of any material which is inert in salt water and is preferably transparent for enhanced viewing pleasure.

There are, of course, many variations that will be apparent from my disclosure and they are to be considered within the scope of the claims unless departing from the substance of the invention.

What is claimed is:

1. An improved salt water aquarium, comprising:
a transparent tank member having a base, salt water fish being advantageously displayed therein;
a base member positioned below and supporting the base of said transparent tank member;
a combination air-water filter head disposed on the base of said transparent tank member and communicating with said base member, said filter head having a water inlet means, a water outlet means and an air inlet means;
an isolation valve positioned within said base member and coupled to the water outlet means;
a filter unit positioned within said base member and having an inlet and outlet, said isolation valve operatively coupled to said inlet, said filter unit being substantially as large as said base member and thereby having a relatively large surface area, water being circulated through said filter from said tank member for filtration thereof, a valve responsive to the liquid level in the filter positioned at the inlet for maintaining the water level within said filter unit at a predetermined desired level, said filter unit being uncovered and thereby exposed to the air within said base;
a pump member positioned within said base and coupled to the outlet of said filter unit; and
a check valve coupled between said pump member and said water inlet means for preventing backflow of water if said pump is inoperative.

2. The improved aquarium of claim 1 wherein said filter unit comprises an algae incubator section, a plurality of filter sections utilizing successively finer filter material and an activated carbon filter section, serially connected, said activated carbon filter section being substantially smaller than said successive filter sections.

3. The improved aquarium of claim 2 wherein said combination air-water filter head is positioned in a corner of said transparent tank member, said tank member base having an aperture in the corner thereof conforming to the shape of said filter head, a water tight, salt water resistant seal being formed between said tank member base and said combination filter head.

4. The device of claim 3 wherein said combination air-water filter head is of a unitary construction.

5. The device of claim 3 wherein said combination air-water filter head includes a mounting plate, said mounting plate conforming to the aperture in said tank member base and being positioned therein, a portion of said mounting plate abutting the side of said transparent member and a free edge of said mounting plate extending into said tank, said mounting plate having an aperture therein, a flange extending from said mounting plate and positioned on said tank member base, said inlet means being comprised of a conduit communicating with said tank through said aperture in said mounting plate, and said outlet means being comprised of a conduit extending through said mounting plate into said tank, a wall extending upwardly from the free edge of said mounting plate, one section of said wall having a plurality of relatively small aperatures for the passage of water, and a top section extending from said wall and tapered upwardly toward the corner of said tank, said inlet conduit being positioned on said top section whereby said inlet means and said outlet means are separated.

6. The device of claim 3 further including an air pump coupled to said air inlet means.

7. The device of claim 6 wherein said valve responsive to the liquid level in the filter is a float valve.

* * * * *